INVENTOR.
HERBERT R. APPELL

United States Patent Office 3,520,921
Patented July 21, 1970

3,520,921
PREPARATION OF CIS-HEXAHYDROPHTHALIC ACID FROM PHTHALIC ACID
Herbert R. Appell, Pitcairn, Pa., assignor to Koppers Company, Inc., a corporation of Delaware
Continuation-in-part of application Ser. No. 460,251, June 1, 1965. This application Apr. 5, 1967, Ser. No. 628,732
Int. Cl. C07c 61/08
U.S. Cl. 260—514                          4 Claims

ABSTRACT OF THE DISCLOSURE

An increased rate of reaction and increased yields of cis-hexahydrophthalic acid are produced by hydrogenating phthalic acid in a lower fatty acid, lower alkyl alcohol or lower alkyl ether solvent which contains 0.5 to 4 percent by weight of water in the presence of platinum dioxide as catalyst. The cis-hexahydrophthalic acid is especially useful in the preparation of polyester resins and other resinous compounds.

This application is a continuation-in-part of my copending application Ser. No. 460,251, filed June 1, 1965.

BACKGROUND OF THE INVENTION

Cis-hexahydrophthalic acid and cis-hexahydrophthalic anhydride are especially useful for the preparation of polyester resins and provide improved chemical resistance to such resins which enables the formulation of resins that are light in color and have increased stability.

Phthalic anhydride is readily available, but as yet no simple inexpensive process has been found to hydrogenate the phthalic anhydride to cis-hexahydrophthalic acid for anhydride. The hydrogenation of phthalic anhydride usually produces phthalide as the main product, accompanied by products such as phthalyl alcohol, phthalan and other various hydrocracked fragments.

A known procedure to obtain hexahydrophthalic acid, as set forth in U.S. Pat. 2,828,335, is to hydrogenate a phthalic acid salt and thereafter convert the hexahydrophthalic salt to the corresponding hexahydrophthalic acid. This process for converting phthalic acid to hexahydrophthalic acid requires the intermediate step of producing the corresponding salt of the hexahydrophthalic acid and thereafter converting the salt to the corresponding hexahydrophthalic acid.

Hexahydrophthalic acid has been prepared in the past by dissolving phthalic acid in glacial acetic acid or absolute alcohol and hydrogenating the dissolved acid in the presence of a platinum catalyst. The hydrogenation process, however, is slow and the yields are poor. When the hydrogenation process is accelerated, undesirable side reactions occur that yield byproducts. There is, therefore, a need for a simple, inexpensive process to rapidly hydrogenate phthalic acid and obtain hexahydrophthalic acid in quantitative yields and without undesirable side reactions.

SUMMARY OF THE INVENTION

It has been discovered that if phthalic acid is dissolved in a solvent containing from 0.5 to 4 percent by weight of water, and thereafter the solution is subjected to a gas containing elemental hydrogen in the presence of platinum dioxide, at a temperature below 120° C., and at relatively low pressures, that it is now possible to quantitatively convert phthalic acid to cis-hexahydrophthalic acid in a relatively short period of time. By including a small amount of water with a lower fatty acid, lower alkyl ether or a lower alkyl alcohol, it is now possible to obtain a rapid reaction rate by which the hydrogenation of phthalic acid is carried out to produce quantitative yields of cis-hexahydrophthalic acid with the elimination of undesirable side reactions.

Accordingly, it is the principal object of the invention to provide an improved process for hydrogenating phthalic acid to obtain cis-hexahydrophthalic acid in quantitative yields.

Another object of this invention is to provide a process in which the reaction rate of elemental hydrogen with phthalic acid is greatly increased in order to yield quantitative yields of cis-hexahydrophthalic by hydrogenating acid in a solvent containing 0.5 to 4 percent of weight of water and in the presence of platinum dioxide at relatively low temperatures and pressures.

Other objects and advantages will appear as the description proceeds.

DETAILED DESCRIPTION

Figure 1:
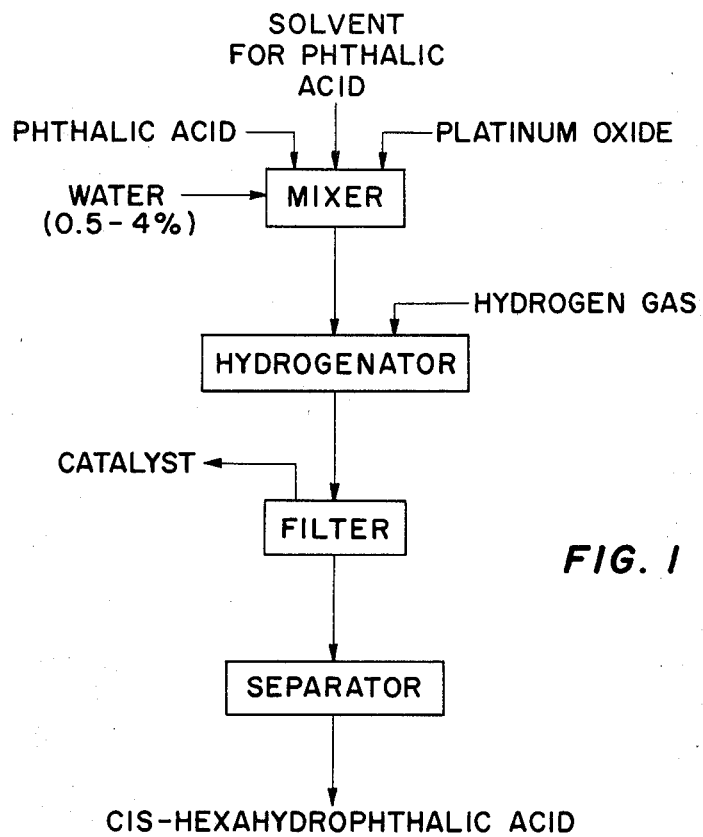
In FIG. 1, there is illustrated a diagrammatic representation of the process of the invention for hydrogenating phthalic acid and recovering cis-hexahydrophthalic acid. The phthalic acid is mixed with the desired solvent containing 0.5 to 4 percent by weight water based upon the amount of solvent. To this mixture, there is added platinum dioxide as the hydrogenation catalyst. The mixture is then treated with elemental hydrogen in a hydrogenation reactor, subsequently filtered to remove the catalyst and the product solution fed to a separator to remove the cis-hexahydrophthalic product therefrom.
Figure 2:
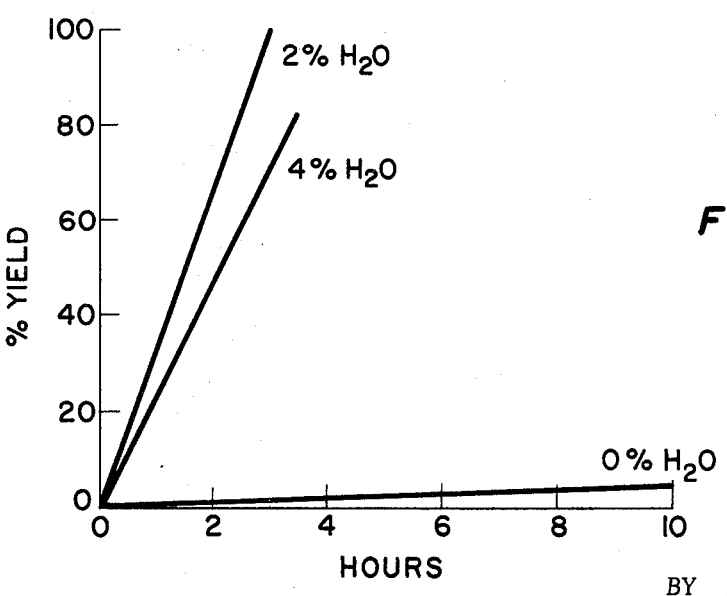
In FIG. 2, there is graphically illustrated the effect of water, when used in acetic acid, upon the rate of reaction of elemental hydrogen with phthalic acid in the production of cis-hexahydrophthalic acid according to the present invention.

The present process provides a method of obtaining, at greatly increased reaction rates, quantitative yields of cis-hexahydrophthalic acid by dissolving phthalic acid in a solvent which is not itself readily hydrogenated containing from 0.5 to 4 percent by weight of water.

The solvent system contains 0.5 to 4 percent by weight of water. Although the optimum amount of water may vary with the particular solvent selected, and the temperature at which the hydrogenation reaction is carried out; generally, best results are obtained with about 2 percent by weight of water present in the solvent. If less than 0.5 percent water is used, the reaction rate is decreased, while if an excess over about 4 percent water is used, the reaction rate is also decreased.

The phthalic acid is dissolved in a sufficient amount of the solvent containing a minor amount of water to form a liquid. If it is desired to increase the capacity of the hydrogenation apparatus, the admixture of phthalic acid and the aqueous solvent may contain an excess of phthalic acid as long as the resultant suspension of phthalic acid in the solvent remains fluid.

The phthalic acid, water containing solvent solution is transferred to a hydrogenation vessel and platinum dioxide added thereto. The vessel is sealed and a hydrogen-containing gas is fed into the vessel at desired pressures. The gas is preferably substantially all hydrogen. The vessel may, if desired, be agitated and heated during the hydrogenation reaction. Preferably, to further accelerate the hydrogenation process, the vessel is heated to moderate temperatures up to about 120° C. After the hydrogenation reaction, the vessel is cooled and the excess hydrogen removed. The product is filtered to remove the catalyst and the solvent separated from the cishexahydrophthalic acid in the filtrate.

A solvent which dissolves phthalic acid and is not itself readily hydrogenated is used. Suitable solvents used in the heretofore described process are the lower fatty acids such as acetic and propionic acid, the lower alkyl alcohols such as methyl, ethyl, and various butyl alcohols, and the lower alkyl ethers such as methyl, ethyl and various butyl ethers. Acetic acid or ethanol is the preferred solvent. The solvents are diluted with from 0.5 to 4 percent by weight of water, preferably with about 2 percent by weight of water.

The catalyst which is used in conjunction with the above-described composition is platinum dioxide. This catalyst is readily available and when used in conjunction with the solvent system of the present invention, results in a surprisingly increased reaction rate whereby quantitative yields of cis-hexahydrophthalic acid are prepared in a relatively short period of time. The use of this catalyst in conjunction with the novel solvent system of the present invention causes the great increase in reaction rate and provides a superior method of producing cis-hexahydrophthalic acid from phthalic acid over any process heretofore described.

Suitable temperatures in the hydrogenation reaction are between ambient temperature and about 120° C. It is preferred to heat the hydrogenation vessel so that the temperature of the reaction system is between about 50 to 100° C. Between these temperatures, the hydrogenation reaction is accelerated and is completed within a relatively short time.

The pressure at which the hydrogenation reaction takes place is not critical. The hydrogenation reaction proceeds rapidly at a gas pressure of about 50 lbs. per square inch. Increased gas pressure may, however, be beneficial in accelerating the hydrogenation reaction.

The proportions of the constituents, other than the amount of water in the conventional hydrogenation solvent are not critical. A sufficient amount of the solvent system, however, should be mixed with phthalic acid so that the admixture remains fluid. The admixture, if desired, may contain an excess of phthalic acid.

My invention is further illustrated by the following examples.

EXAMPLE I 8.3 grams of phthalic acid were dissolved in 100 ml. of acetic acid that contained 2 percent water to form a solution. 0.1 gram of platinum dioxide was added to the solution. The admixture was then introduced into a conventional hydrogenation autoclave and the autoclave was pressured to 50 p.s.i.g. with hydrogen gas. The autoclave was then heated to about 50° C. and maintained at that temperature for approximately 2½ hours. After that period, the hydrogenation reaction was complete and the platinum dioxide catalyst was separated from the product by filtration. A quantitative yield of cis-hexahydrophthalic acid was separated from the solvent.

EXAMPLE II

Example I was repeated using 100 mls. of glacial acetic acid as the solvent. The hydrogenation process was first carried out at ambient temperature for about 7 hours and thereafter at a temperature of 60° C. for about 10 hours. Only 4 percent of the possible quantitative yield of hexahydrophthalic acid was recovered. A comparison of Example I and Example II clearly illustrates the improved yield and greatly increased reaction rate of hexahydrophthalic acid that may be obtained by employing the novel aqueous solvent system.

EXAMPLE III

The process of Example I was repeated except that the acetic acid solvent contained 4 percent water. After 3½ hours, 82 percent yield of cis-hexahydrophthalic acid was obtained.

EXAMPLE IV

The process of Example I was repeated except that the solvent was ethanol containing 2% water. Hydrogenation was complete within an hour and a quantitative yield of cis-hexahydrophthalic acid was obtained.

EXAMPLE V

The process of Example IV was repeated except that absolute ethanol was employed as the solvent. The time for completion of the conversion of phthalic acid to cis-hexahydrophthalic acid was increased from one hour as occurred in Example IV to a period of two hours.

It is apparent from the above examples that the use of a minor amount of water, in conjunction with lower alcohols, acids or ether solvents, when using platinum dioxide in the hydrogenation of phthalic acid results in quantitative yields of cis-hexahydrophthalic acid in relatively short periods of time and at low pressures. Where it is desired to further accelerate the process, high pressures of several atmospheres may be used. Further, where it is desired to increase the capacity of the hydrogenation apparatus, the phthalic acid may be added in amounts above its solubility in the solvent system. It is preferred, however, that the suspension of the phthalic acid in the aqueous solvent system remain fluid for a relatively rapid reaction with the hydrogen gas in the hydrogenation vessel.

I claim:

1. In a process for the preparation of cis-hexahydrophthalic from phthalic acid by contacting said phthalic acid with gaseous hydrogen in the presence of platinum dioxide, at a temperature of ambient temperature to 120° C. and under superatmospheric pressure, in an organic solvent selected from the group consisting of lower alkyl alcohols, lower fatty acids, lower alkyl ethers, dioxane and tetrahydrofuran, the improvement comprising adding to said organic solvent 0.5–4% by weight of water based on the weight of said solvent to increase the reaction rate of said hydrogen with said phthalic acid to produce cis-hexahydrophthalic acid.

2. The process of claim 1 wherein said organic solvent is ethanol.

3. The process of claim 1 wherein said organic solvent is acetic acid.

4. The process of claim 1 wherein said temperature is 50–120° C.

References Cited

UNITED STATES PATENTS

| | | | |
|---|---|---|---|
| 2,888,484 | 5/1959 | Dehn et al. | 260—514 |
| 2,675,390 | 4/1954 | Rosenblatt | 260—514 |
| 3,162,679 | 12/1964 | Rylander et al. | 260—514 |
| 3,177,258 | 4/1965 | Rylander et al. | 260—611 |

JAMES A. PATTEN, Primary Examiner

P. J. KILLOS, Assistant Examiner